United States Patent Office 3,178,302
Patented Apr. 13, 1965

3,178,302
THIXOTROPIC COATING COMPOSITION
Alec Richard Hornsey Tawn and Alec Frank Wilson, London, England, assignors to Coates Brothers & Company Limited, London, England
No Drawing. Filed Dec. 21, 1960, Ser. No. 77,270
Claims priority, application Great Britain, Jan. 14, 1960, 1,428/60
7 Claims. (Cl. 106—219)

This invention relates to ester bodies which have been rendered thixotropic by the incorporation of polyamide resins and to polyamides therefor.

The production of thixotropic vehicles of value in paints and other surface coatings by incorporating certain polyamide resins into ester bodies (such as alkyds, stand oils, and oleoresinous varnishes) at 430–500° F. has already been described in U.S. Patent 2,663,649 and elsewhere. The polyamide resins stipulated had molecular weights in the range 3000–9000, being made by reacting dimerised and/or trimerised fatty acids with alkylene polyamines having 2–4 amine groups per molecule, and those of this kind which were commercially available had amine numbers of about 4.

In the manufacture of the vehicle in this known manner the ester body is first prepared and then compounded with the polyamide resin. Hitherto this has required the application of substantial heat and careful control over the processing because if this heating is continued after maximum thixotropy has developed this property rapidly falls off. In addition, at the processing temperature, there is a tendency for the ester body itself to polymerise. This complicates the whole operation because the ester body then has to be prepared with properties such as to reach a desired degree of polymerisation simultaneously with the attainment of maximum thixotropy of the mixture. In so far as the development of thixotropy is not wholly understood and the process is to some extent empirical and so subject to variation there has been a need to moderate the heat treatment.

We have already proposed to overcome these difficulties, at least in part, by reacting the ester body with a polyamide resin having a molecular weight below 3000, but preferably above 1000. The polyamide resin may with advantage have an amine value of at least 10.

The expression "polyamide resin" in this connection means a polyamide made by reacting a polymerised (generally dimerised and/or trimerised) fatty acid with an alkylene polyamine, the latter preferably having 2–4 amine groups per molecule. The polymerised fatty acid may be replaced, wholly or in part, by an aliphatic dicarboxylic acid in which the carboxyl groups are separated by at least 4 carbon atoms together with a substantial excess of monocarboxylic acid to promote solubility.

The use of low molecular weight polyamides in accordance with that proposal in the production of thixotropic vehicles generally enables much lower temperatures to be employed, for example 180–200° C., whilst in some cases, especially with high amine numbers, simple mixing in the presence of a solvent at room temperature is adequate. Moreover the polyamides are inherently more soluble than those hitherto employed, facilitating the use of aliphatic solvents as diluents and for brush cleaning. Because only short and gentle heating is needed, if at all, loss of thixotropy is much less liable to occur and the process control is simplified. The polyamides, especially where the amine number is 12 or higher, are more readily combined with neutral ester bodies without resorting to catalysts of alcoholysis or activation of the ester bodies by preheating.

Such use of low molecular weight polyamides nevertheless leaves some of the shortcomings of the original process. The thixotropic properties of a vehicle suitable for the preparation of surface coatings (e.g., paints) are far from simple and have at least two important aspects. One, which may be called the degree of thixotropy, is measured by the gel-strength of the unsheared vehicle, or by the difference between the sheared and unsheared viscosities. The other aspect is the rate at which the viscosity falls (or the gel breaks down to fluid) under the action of a given shearing stress and the rate at which the sheared material increases in viscosity after shearing stress is removed. These may be called the breakdown and recovery rates of the system.

A difficulty common to the processes of U.S.P. 2,663,649 and of our recent proposal is that of obtaining independent control of these two aspects of rheological behaviour when formulating a thixotropic vehicle. This difficulty is, we believe, present in all the processes of the prior art.

The present invention consists in a process for making thixotropic coating compositions which comprises heating an ester body with a first polyamide of a polymeric fatty acid and an aliphatic $\alpha,\omega$-diprimary amine until thixotropic properties are developed, continuing the heating until the thixotropic properties are substantially diminished, and then incorporating at a temperature below 220° C. a second polyamide having a molecular weight not exceeding 3000 of an alkylene polyamine and a fatty acid or polymeric fatty acid. The second polyamide is preferably incorporated at a temperature in the range 100–200° C.

The first polyamides initially incorporated into the ester bodies may be the same as those described in U.S. specification 2,663,649 hereinbefore referred to, having molecular weights in the range 3000–9000, or may be those employed in accordance with our earlier proposal having molecular weights in the range 1000–3000. These polyamides are, for convenience, hereinafter designated as type A polyamides. In each case, the mixture of type A polyamide and ester body is generally heated at a temperature in the range 220–280° C. for the reduction or substantial destruction of the thixotropic character of the initially formed composition. It will be understood that, in the case of polyamides having molecular weights exceeding 3000, it is generally necessary to heat at a temperature in this range for some time before the thixotropic properties are fully developed, and the temperature will then be maintained at this level well beyond the end point which would otherwise have been regarded as appropriate. When the lower molecular weight polyamides are used, the thixotropic properties will develop more rapidly and may already be manifested whilst a mixture of the reactants is being heated up to the aforesaid temperature range.

The polymeric fatty acids used in the preparation of the polyamides are polymers of unsaturated fatty acids (e.g., linoleic acid). They may be obtained in impure form, i.e., mixed with monomeric acids, by hydrolysis of stand oils (unsaturated fatty oils which have been polymerised by heat). We generally prefer, however, to use the materials known commercially as "dimerised fatty acids" or "dimer acids." These contain little monomer but trimer and higher polymers are usually present in amounts up to 25%. Suitable dimer acids can be made by the method of U.S. Patent 2,482,761 but we do not limit our invention to polyamides made with polymeric fatty acids so obtained.

The polyamides to be added after the incorporation of the type A polyamides are, for convenience, hereinafter designated as type B. In addition to the polyamides of dimerised and/or trimerised fatty acids with alkylene polyamines, preferably those having 2–4 amino groups per molecule, there are included the simple diamino-diamides obtained by reaction of fatty acids (preferably of C10–C22 chain length) or the esters of these with α,ω-diprimary amines; the polymerised fatty acid may be replaced wholly or in part by an aliphatic dicarboxylic acid in which the carboxyl groups are separated by at least 4 carbon atoms together with a substantial excess of monocarboxylic acid to promote solubility.

The process of the present invention affords the following advantages:

(i) Very widely varying types of thixotropic behaviour can be imparted to ester bodies by the use of the two stage process. The first stage "conditions" the ester body to receive the degree of thixotropy imparted by the type B polyamide. In this sense the first stage largely controls the breakdown and set-up rates of the final system.

(ii) A wide range of ester bodies can be rendered thixotropic by this means. When the ester body is substantially free from hydroxyl and carboxyl functions the use of a type A polyamide having a high acid or amine value ensures a satisfactory reaction.

(iii) Neither the 1st nor the 2nd stage is particularly critical. In formulating a thixotropic vehicle according to the present invention for commercial purposes, a suitable ester body is selected, generally on the basis of the ultimate film-forming performance required in accordance with the well established principles of the art. One then tests routinely with 1st and 2nd stage polyamides (types A and B respectively) and cooking procedures to obtain the required balance of thixotropic properties. The main problem facing the formulator is to find a type A procedure to suit the ester body concerned which gives the particular desired set-up and breakdown rates. Such routine test or "trial and error" procedures are common to the formulation of most surface coating vehicles. Appreciable departures from the optimum first stage cooking schedule are permissible, that is to say, close control of the first stage cook is not required. Once an appropriate second stage addition has been selected little or no process control is necessary for this stage.

(iv) The advantages described for our earlier proposal are retained with the single exception that a high temperature cook is involved (in the first stage).

The following examples show how the invention may be carried into effect.

*Preparation of type A polyamides*

(1) Ethylene diamine 44.85 g. is added to a stirred mixture of dimer acid 376 g. and the fatty acids of sunflower oil 24 g. The resultant mixture is held at a temperature of 120° C. under reflux for 2 hours, and is then heated to 200° C. under conditions of distillation in 2 hours. It is held at this temperature until no more water distilled off; the product had an acid and amine value of 4.0.

(2) Ethylene diamine 56.1 g., dimer acid 564 g. and the fatty acids of sunflower oil 36 g. are reacted together as just described. Heating is stopped when the product has an acid value of 39 and zero amine value.

(3) Ethylene diamine 55.2 g., dimer acid 400 g., sunflower fatty acids 50 g. are reacted as described above to yield a polyamide of acid value 5.6 and amine value 6.6.

(4) Ethylene diamine 82.6 g., dimer acid 564 g. and sunflower fatty acids 36 g. are reacted as described above to yield a polyamide of amine value 28 and acid value 3.

(4a) Ethylene diamine 33.8 g., diethylene triamine 15.2 g., dimer acids 350 g. and sunflower fatty acids 50 g. are reacted as described above to yield a polyamide of amine value 21.2 and acid value 5.1.

*Preparation of type B polyamides*

(5) Ethylene diamine 72 g., dimer acid 200 g. and sunflower fatty acids 400 g., are reacted as described above to yield a polyamide of acid and amine value 4.

(6) Ethylene diamine 122 g., dimer acid 200 g. and sunflower fatty acids 800 g. are reacted as described above to yield a polyamide of acid and amine value 6.

(7) Ethylene diamine 24 g. and sunflower fatty acids 200 g. are reacted as described above to yield a polyamide of acid value 2.8 and amine value 1.4.

(8) Hexamethylene diamine 51.9 g., dimer acid 50 g. and soybean fatty acids 125 g. are reacted as described above to yield a polyamide acid of value 5.1 and amine value 1.1.

*Preparation of thixotropic ester bodies*

(9a) Linseed oil 3600 g., pentaerithritol 720 g. and litharge 8.0 g. were heated together with stirring at 240° C. for 1 hour. Phthalic anhydride 1280 g. and xylol 50 g. were added and the mixture heated to 240° C. and held at this temperature whilst liberated water of reaction was removed by means of a Dean and Stark separator. The temperature was maintained at 240° C. until a 70% solution of the alkyd in white spirit had a viscosity of 12 stokes at 25° C.

(9b) 500 g. of the product (9a) was heated with stirring to 230° C. and 15 g. of the polyamide of Example 1 was added. The temperature was maintained at 230° C. until a sample thinned to 60% solids with white spirit resulted in a clear non-thixotropic system (approximately 300 minutes). 1.0 g. of the polyamide of Example 5 was dissolved by warming to about 100° C. in 100 g. of this product which was then thinned to 60% solids with white spirit. The product was a thixotropic vehicle which was useful for the manufacture of thixotropic paints and varnishes. The use of the polyamide of Example 6 in place of that of Example 5 also resulted in a firm thixotropic gel.

(10) 500 g. of the alkyd of Example 9a was heated with stirring to 230° C. and 15 g. of the polyamide of Example 3 was added. Reaction was carried to the same end point as in Example 9b the time required being 180 minutes. 1.0 g. of the polyamide of Example 5 was dissolved by warming in 100 g. of the product which was then thinned to 60% solids with white spirit. A thixotropic vehicle resulted suitable for the preparation of thixotropic paints.

(11) 500 g. of the alkyd of Example 9a was heated with stirring to 230° C. and 15 g. of the polyamide of Example 4 was added. The first stage reaction was then conducted as in Example 9b. Addition of 1.0% of the polyamides of Examples 5, 6 or 8 to the non thixotropic product obtained at the end of the first stage reaction resulted in thixotropic vehicles which could all be used for the preparation of thixotropic paints.

(12) Example 11 was repeated using the polyamide of Example 2 as the first stage polyamide. The reaction was complete in 100 minutes. 1.0% of the second stage polyamide of Example 5 dissolved in a solution of the first stage product (60% solids in white spirit) formed a thixotropic vehicle.

(13) 500 g. of a 20 poise linseed stand oil was heated at 260° C. with 20 g. of the polyamide of Example 1 until a clear non-thixotropic system (60% solids) was obtained (180 minutes). 10 g. of the second stage polyamide of Example 5 was dissolved in the product by warming and the mixture then cooled. The product was a thixotropic vehicle suitable for use in paints, printing inks and putty.

(14) 500 g. of ester gum (pentaerythritol ester of rosin) and 50 g. of the polyamide of Example 2 were heated together with stirring at 230° C. until the product thinned to 60% solids with white spirit was clear and non-thixotropic. 2% of the second stage polyamide Example 5 was dissolved by warming and the resin cooled. This resin was readily incorporated into oils, alkyds and oleoresinous vehicles and rendered them thixotropic.

(15) Example 11 was repeated using the low molecular weight polyamide of Example 5 as the first stage polyamide. 2% of this polyamide was also used as the second stage polyamide, and the product obtained was a thixotropic vehicle more resistant to breakdown by shearing than a system prepared from the same low molecular weight polyamide, but at low temperatures.

(16) 500 g. of the alkyl of Example 9a was heated with stirring to 230° C. and 15 g. of the polyamide of Example 4a was added. A sample taken after 60 minutes and thinned to 60% solids with white spirit showed only very weak thixotropy, but addition of 1% of the polyamide of Example 5 resulted in a thixotropic vehicle fairly resistant to breakdown by shearing and suitable for the preparation of, for example, thixotropic paints.

We claim:
1. A process for producing thixotropic coating compositions which comprises
   (a) forming a mixture of
       (1) an ester body
       (2) a first polyamide of a polymeric fatty acid, and
       (3) an aliphatic $\alpha,\omega$-diprimary amine,
   (b) heating said mixture until it develops thixotropic properties,
   (c) further heating said mixture until its thixotropic properties have passed through a peak value and have become substantially diminished,
   (d) incorporating into the resulting mixture a second polyamide of an alkylene polyamine and a fatty acid selected from the group consisting of polymeric and non-polymeric fatty acids,
   (e) said second polyamide having a molecular weight not exceeding 3,000,
   (f) said second polyamide being incorporated with said mixture at a temperature below 220° C., and
   (g) said ester body being selected from the group consisting of alkyds, stand oils and oleoresinous varnishes.

2. A process according to claim 1 in which the second polyamide is incorporated at a temperature in the range 100–200° C.

3. A process according to claim 1 in which the first polyamide has a molecular weight in the range 1000–9000.

4. A process according to claim 1 in which the continued heating to effect diminution of the thixotropic properties is effected at 220–280° C.

5. A process according to claim 1 in which the second polyamide is likewise a polyamide of a polymeric fatty acid and an aliphatic $\alpha,\omega$-diprimary amine.

6. A process according to claim 1 in which the second polyamide is a diamino-diamide obtained by reaction of a fatty acid with a $\alpha,\omega$-diprimary amine.

7. A process according to claim 1 in which the heating is continued until the thixotropic properties are substantially destroyed.

References Cited by the Examiner

UNITED STATES PATENTS

| | | | |
|---|---|---|---|
| 2,663,649 | 12/53 | Winkler | 106—287 |
| 2,861,048 | 11/58 | Wright | 106—287 |
| 2,932,623 | 4/60 | Glaser | 260—22 |

ALEXANDER H. BRODMERKEL, *Primary Examiner.*
JOSEPH REBOLD, MORRIS LIEBMAN, *Examiners.*